United States Patent [19]

Yamaguchi et al.

[11] Patent Number: 5,304,243

[45] Date of Patent: Apr. 19, 1994

[54] METHOD OF PRODUCING ORGANIC GROUP MODIFIED SILICA PARTICLES

[75] Inventors: Muneaki Yamaguchi, Ikeda; Yuko Tanaka, Kawanishi; Hiromasa Ogawa, Ikeda, all of Japan

[73] Assignees: Agency of Industrial Science & Technology; Ministry of International Trade & Industry, both of Tokyo, Japan

[21] Appl. No.: 984,735

[22] Filed: Dec. 2, 1992

Related U.S. Application Data

[62] Division of Ser. No. 712,427, Jun. 10, 1991, abandoned.

[30] Foreign Application Priority Data

Sep. 4, 1990 [JP] Japan ............................ 2-234867

[51] Int. Cl.$^5$ ........................ C03B 8/02; C03B 3/00; C01B 3/18
[52] U.S. Cl. .................................. 106/490; 428/405
[58] Field of Search ........................ 428/405; 106/490

[56] References Cited

U.S. PATENT DOCUMENTS

| | | | |
|---|---|---|---|
| 3,689,300 | 9/1972 | Bunger | 106/490 |
| 3,834,924 | 9/1974 | Grillo | 106/490 |
| 3,915,735 | 10/1975 | Moreland | 106/490 |
| 4,017,528 | 4/1977 | Unger | 556/457 |
| 4,344,800 | 8/1982 | Lutz | 106/490 |
| 4,877,451 | 10/1989 | Winnik | 106/490 |
| 4,923,520 | 5/1990 | Anzai | 106/490 |
| 4,950,635 | 8/1990 | Williams | 428/405 |
| 5,013,585 | 5/1991 | Shimizu | 428/405 |

OTHER PUBLICATIONS

"Coupling Agents", Modern Plastics, 60, pp. 117-119 (1983-84).

*Primary Examiner*—John C. Bleutge
*Assistant Examiner*—D. R. Wilson
*Attorney, Agent, or Firm*—Oblon, Spivak, McClelland, Maier & Neustadt

[57] ABSTRACT

Organic group modified silica particles modified by at least one of an alkyl group of a carbon number of 1-6 and a substituted alkyl group of a carbon number of 1-6; a method of producing such modified silica particles comprising the steps of preparing an alcohol solution containing an alkoxy silane having at least one of an alkyl group of a carbon number of 1-6 and a substituted alkyl group of a carbon number of 1-6, and ethylsilicate, mixing an alcohol ammonia water solution into this alcohol solution under stirring, and allowing the alkoxy group to hydrolyze completely; and a resin composition consisting of such modified silica particles and a resin.

3 Claims, 1 Drawing Sheet

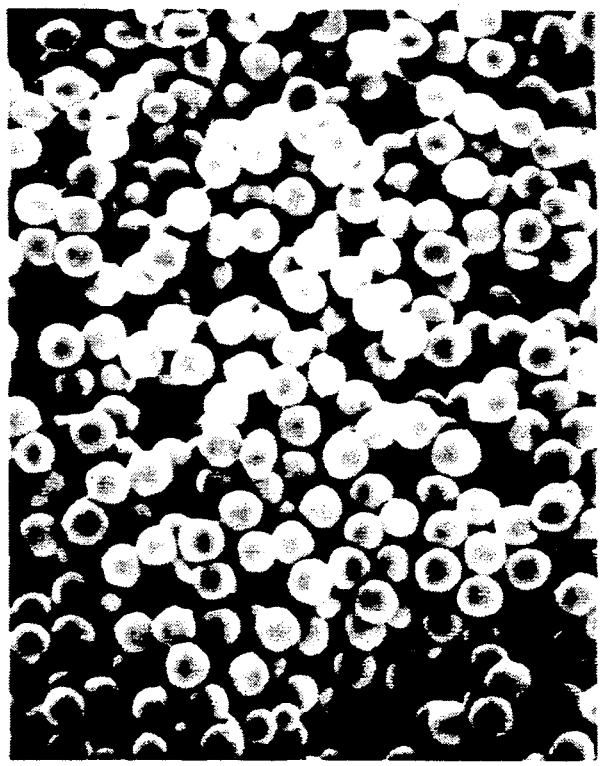

METHOD OF PRODUCING ORGANIC GROUP MODIFIED SILICA PARTICLES

This application is a division of application Ser. No. 07/712,427, filed on Jun. 10, 1991, now abandoned.

BACKGROUND OF THE INVENTION

1. Field of the Invention

This invention relates to silica particles modified by at least one type of organic group.

2. Description of the Prior Art

Silica particles are widely used as filler in resin compositions employed as sealants in integrated circuit devices (ICs) and other electronic components.

The steady increase in the packing density of ICs in recent years has led to demand for sealants with outstanding thermal shock resistance and toughness. In response to this demand, efforts have been made to improve the quality of the silica particles used as filler in these sealants. Attempts have also been made to improve the toughness and other properties of silica particles for use as filler in various types of resin-type composite materials other than sealants. Up to now, however, no pronounced improvement in the properties of resin compositions has actually been realized through improvement of the properties of the silica particles used as filler therein.

Through his studies in connection with a particular process used for the production of spherical silica particles, namely the sol-gel process, the inventors discovered that the addition of an alkoxy-silane having a specific organic functional results in the production of silica particles having a specific organic modifier group and that these silica particles dramatically improve the properties of resin products in which they are used as filler.

SUMMARY OF THE INVENTION

In one of its aspects, this invention provides organic group modified silica particles modified by at least one of an alkyl group of a carbon number of 1-6 and a substituted alkyl group of a carbon number of 1-6.

In another of its aspects, the invention provides a method of producing organic group modified silica particles comprising the steps of preparing an alcohol solution containing an alkoxy silane having attached to silicon at least one of an alkyl group of a carbon number of 1-6 and a substituted alkyl group of a carbon number of 1-6, and ethylsilicate, mixing an alcohol ammonia water solution into this alcohol solution under stirring, and allowing the alkoxy group to hydrolyze completely.

In still another of its aspects, the present invention provides a resin composition consisting of the aforesaid organic group modified silica particles and a resin.

BRIEF DESCRIPTION OF THE DRAWING

The single figure is a scanning electron micrograph at 10,000 magnifications of organic group modified silica particles produced according to the method of the present invention.

DETAILED DESCRIPTION OF THE PREFERRED EMBODIMENT

The alkoxy silane used in this invention as a starting material for introduction o a specific, organic modifier group to the silica has attached to silicon of the silane at least one of an alkyl group of a carbon number of 1-6 and a substituted alkyl group of a carbon number of 1-6. Alkyl groups fitting this description include methyl group, ethyl group, propyl group, butyl group, pentyl group, hexyl group, γ-glycidoxypropyl group, γ-aminopropyl group, N-β-(aminoethyl)-γ-aminopropyl group, 3,4-epoxycyclohexyl group and the like. Among these, γ-glycidoxypropyl group, γ-aminopropyl group, N-β-(aminoethyl)-γ-aminopropyl group and 3,4-epoxycyclohexyl group are preferred.

The aforesaid alkoxy silanes having an alkyl or substituted alkyl group attached to silicon can be termed alkylalkoxysilanes or substitutedalkylalkoxysilanes.

In this invention, the aforesaid alkoxy silane is mixed with ethylsilicate, the resulting mixture is dissolved in at least one alcohol compatible with water and thereafter added dropwise under stirring to an alcohol ammonia water solution for hydrolyzing the alkoxy group.

For practical application of the foregoing method, the ratio of the aforesaid alkoxy silane to ethylsilicate is preferably 0.5-3.0 wt %.

The concentration of the aforesaid mixture consisting of the mixture of ethylsilicate and the aforesaid alkoxy silane in alcohol solution is preferably about 10-30%.

Alcohols compatible with water include methanol, ethanol, propanol, isopropanol, t-butanol and the like.

As the alcohol in the alcohol ammonia water solution there is also used one which is compatible with water. The alcohol concentration of the alcohol ammonia water solution is preferably about 50-70% and the ammonia concentration thereof is preferably about 2.5-6.0%.

Since the alkoxy group is completely hydrolyzed at the time of dripping the alcohol solution of the mixture of ethylsilicate and the aforesaid alkoxy silane into the alcohol ammonia water solution, an excessive amount of water is caused to be present. A temperature of about 20°-30° C. is preferable for the hydrolysis reaction.

Following completion of hydrolysis, the precipitated silica particles are filtered out, washed and dried, whereby there are obtained desired specific organic group modified silica particles which excel in dispersibility and are of uniform diameter. The diameter of the silica particles can be controlled by controlling the size of the drops at the time of dripping the alcohol solution of the ethylsilicate- the aforesaid alkoxy silane mixture, the stirring rate and/or other parameters. Through such control it is possible, for example, to produce minute spherical silica particles of a diameter on the order of 0.5 μm.

It was confirmed by elemental analysis, infrared spectral analysis and thermal analysis that alkyl groups derived from the aforesaid alkoxy silane used are bound to the surface of the silica particles obtained.

When the modified silica particles according to the invention are to be used as filler in a resin composition by dispersion in epoxy resin or the like, it suffices to blend the silica particles with the resin in a conventional manner. The modified silica particles can also be used in the conventional manner as a filler in resin-type composite materials.

The main application of the silica particles according to the invention is as filler for resin compositions and when they are used for this purpose they exhibit the following effects:

(1) Since the silica particles and the resin exhibit a strong mutual interaction at the interface therebetween, the strength of the resin composition can be maintained even when the silica particles are incorporated in a larger quantity than that at which unmodified silica particles have been used in the past.

(2) Since the ratio of silica to resin can be increased, resin-type composite materials using the silica particles can be expected to exhibit a smaller coefficient of thermal expansion and the interfacial stress induced between a sealant using the silica particles and the device sealed thereby owing to changes in temperature can be reduced.

(3) Resin compositions and resin-type composites employing the silica particles as filler exhibit improved mechanical properties (toughness, flexural elasticity etc.) and heat resistance property.

The features of the present invention will now be further elucidated with reference to Examples and Comparative Examples.

EXAMPLES 1-3

To 100 parts by weight of ethylsilicate were added 1.7 parts by weight of an alkoxy silane having a γ-glycidoxypropyl group (Example 1), a γ-aminopropyl group (Example 2) or an N-β-(aminoethyl)-γ-aminopropyl group (Example 3) attached to silicon and the result was dissolved in 350 parts by weight of ethanol.

Each of the solutions was then dripped under stirring into 500 parts by weight of an ethanol ammonia water solution (ethanol concentration of 60 wt %, ammonia concentration of 5.3%). Stirring was continued for 3 hours for carrying out hydrolysis.

Upon completion of the hydrolysis reaction, the precipitated silica particles (particle diameter of about 0.4-0.5 μm) were filtered out, washed and vacuum-dried.

The bond between the silica particle and the modifier group was confirmed by (a) elemental analysis, (b) the fact that the differential spectrum between modified silica particles and unmodified particles obtained by infrared spectral analysis (FTIR) showed absorption by the modifier group, and (c) the fact that in thermal analysis (TG-DTA) exothermic peaks and accompanying loss in weight appeared at 450° C. in the case of the γ-glycidoxypropyl group modified silica particles, at 490° C. in the case of the γ-aminopropyl group modified silica particles and at 450° C. in the case of the N-β-(aminoethyl)-γ-aminopropyl group modified silica particles.

The modified silica particles obtained in the foregoing manner were blended with a resin (bisphenol F diglycidyl ether) in various ratios. In each case the result was kneaded for 30 minutes, added with a curing agent (Methyl himic anhydride, a trademark of Hitachi Chemical Co. for methyl3,6-endmethylene-Δ4-tetrahydrophthalic anhydride) and kneaded for another 30 minutes. The so-obtained mixture was placed in a depressurized reactor, added with an accelerator (N, N-dimethlybenzilamine) and defoamed by mixing at 80° C. for 30 minutes. After being placed in a mold, the defoamed mixture was cured for 3 hours at 100° C. and then for 18 hours at 160° C. to obtain a shaped article. After annealing for 3 hours, the article was used as a test piece for measurement.

The attached figure is a scanning electron micrograph at 10,000 magnifications of silica particles produced according to the method of the present invention.

COMPARATIVE EXAMPLES

For comparison, test pieces were also fabricated in the same manner as in the foregoing example according to the invention using silica particles prepared in the same manner as in Example 1 except for the omission of alkoxy silane.

Table 1 shows the mixing ratios (by weight) of silica particles, epoxy resin, curing agent and accelerator used for producing shaped articles.

In this table, the characters a to c in the Example and Comparative Example reference numbers respectively indicate a silica particle content of 10 vol %, 20 vol % and 40 vol %.

TABLE 1

|  | Silica particles | Epoxy resin | Curing agent | Accelerator |
| --- | --- | --- | --- | --- |
| Examples |  |  |  |  |
| 1-a | 17 | 45 | 49 | 0.5 |
| 1-b | 34 | 40 | 43 | 0.5 |
| 1-c | 72 | 31 | 34 | 0.4 |
| 2-a | 17 | 45 | 49 | 0.5 |
| 2-b | 34 | 40 | 43 | 0.5 |
| 2-c | 72 | 31 | 34 | 0.4 |
| 3-a | 17 | 45 | 49 | 0.5 |
| 3-b | 34 | 40 | 43 | 0.5 |
| 3-c | 72 | 31 | 34 | 0.4 |
| Comparative Examples |  |  |  |  |
| a | 17 | 45 | 49 | 0.5 |
| b | 34 | 40 | 43 | 0.5 |
| c | 72 | 31 | 34 | 0.5 |

Table 2 shows the results obtained when the materials of the compositions shown in Table 1 were measured for bending strength in accordance with the hard plastic bending test prescribed by JIS K2703, under the conditions shown below

| Tester |  |
| --- | --- |
| Instron universal tester |  |
| Test piece dimensions |  |
| Length (l) | 80 mm |
| Width (b) | 10 mm |
| Height (h) | 4 mm |
| Distance between support points (d) | 60 mm |
| Test velocity | 1 mm/min |

$$\text{Bending strength} = \frac{3 \times \text{max load} \times d}{2 \times b \times h^2}$$

TABLE 2

|  | Bending strength (kgf/mm$^2$) |
| --- | --- |
| Example |  |
| 1-a | 13.5 |
| 1-b | 15.26 |
| 1-c | 14.85 |
| 2-a | 14.78 |
| 2-b | 15.31 |
| 2-c | 14.93 |
| 3-a | 15.81 |
| 3-b | 14.04 |
| 3-c | 8.62 |
| Comparative Example |  |
| a | 12.15 |
| b | 10.35 |
| c | — |

Table 3 shows the results obtained when the same materials were measured for impact strength in accordance with the hard plastic Charpy impact test method prescribed by JIS K7111, using a Charpy impact testing machine.

| | |
|---|---|
| Test piece dimensions (No. 1 test piece) | 80 × 10 × 4 mm |
| Notch depth | 2.0 mm |
| Distance between test piece support tables | 60 mm |
| Hammer weight | 10 kg |

Impact strength ($A_{KC}$)

$$A_{KC} = \frac{E}{b(t-d)}$$

E: Absorbed energy
b: Width of test piece notch
t: Thickness of test piece in vicinity of notch
d: Depth of test piece notch The absorbed energy E was calculated as follows $E = WR(\cos\beta - \cos\alpha) - L$ WR: Moment about axis of hammer rotation
α: Hammer lift angle
β: Hammer rebound angle after test piece breakage
L: Energy loss during impact test

TABLE 3

| | Impact strength (kgf/mm$^2$) |
|---|---|
| Example | |
| 1-a | 1.46 |
| 1-b | 1.31 |
| 1-c | 0.78 |
| 2-a | 1.45 |
| 2-b | 1.21 |
| 2-c | 0.76 |
| 3-a | 1.42 |
| 3-b | 0.82 |
| 3-c | 0.40 |
| Comparative Example | |
| a | 0.97 |
| b | 0.69 |
| c | — |

From Tables 2 and 3 it can be seen that for the same silica particle content the resin compositions of the Examples according to the invention exhibit greater bending strength and greater impact strength than the resin compositions of the Comparative Examples. The effect of the invention is thus clearly demonstrated.

We claim:

1. A method of producing silica particles modified by an amino- or epoxy-substituted alkyl group, exhibiting high dispersibility and having a uniform particle size, comprising the steps of:

preparing an alcohol solution compatible with water and containing as reactants (1) ethylsilicate and (2) 0.5 to 3.0 parts by weight, based on 100 parts by weight of said ethylsilicate, of an alkoxy silane having attached to silicon of the alkyoxysilane an amino- or epoxy-substituted alkyl group of a carbon number 1 to 6, with 10 to 30% by weight of combined concentration of said ethylsilicate and said alkoxy silane in said alcohol solution;

preparing an alcohol ammonia water solution consisting essentially of (a) water in an amount required to completely hydrolyze the alkoxy groups of said alkoxy silane, (b) alcohol compatible with water, and (c) ammonia with alcohol concentration in the range of 50 to 70% by weight and ammonia concentration in the range of 2.5 to 6.0% by weight;

adding said alcohol solution dropwise into said alcohol ammonia water solution, thereby hydrolyzing the alkoxy groups of said reactants to precipitate said modified silica particles; and filtering out, washing and drying the precipitated modified silica particles.

2. A method of producing modified silica particles according to claim 1, wherein the silica particles are modified by a γ-glycidoxypropyl group, γ-aminopropyl group, N-β-(aminoethyl)-γ-aminopropyl group or 3,4-epoxycyclohexyl group.

3. A method of producing organic group modified silica particles according to claim 1 wherein the said group attached to silicon is a γ-glycidoxpropyl group, γ-aminopropyl group, N-β-(aminoethyl)-γ-aminopropyl group or 3,4-epoxycyclohexyl group.

* * * * *